United States Patent [19]
Krueger

[11] Patent Number: 5,165,297
[45] Date of Patent: Nov. 24, 1992

[54] REMOTE CONTROLLED MICROMANIPULATOR

[75] Inventor: John W. Krueger, New Rochelle, N.Y.

[73] Assignee: Albert Einstein College of Medicine of Yeshiva University, a Div. of Yeshiva Univ., Bronx, N.Y.

[21] Appl. No.: 656,308

[22] Filed: Feb. 15, 1991

[51] Int. Cl.$^5$ .................... B25J 3/00; G05G 11/00
[52] U.S. Cl. .................... 74/479; 359/391; 359/392; 359/393; 60/533
[58] Field of Search .......... 74/479; 359/391, 392, 359/393; 60/533

[56] References Cited

U.S. PATENT DOCUMENTS

| | | | |
|---|---|---|---|
| 1,987,733 | 0/1935 | De Fonbrune | 74/471 R X |
| 3,010,363 | 11/1961 | Malfeld | 359/393 |
| 4,139,948 | 2/1979 | Tsuchiya et al. | 359/391 |
| 4,584,896 | 4/1986 | Letovsky | 74/479 |
| 4,635,887 | 1/1987 | Hall et al. | 248/179 |
| 4,691,586 | 9/1987 | van Leijenhorst et al. | 74/479 |
| 4,700,584 | 10/1987 | Narishige et al. | 74/479 |
| 4,946,329 | 8/1990 | Krueger | 414/4 |
| 4,948,330 | 8/1990 | Nemura et al. | 359/393 X |

OTHER PUBLICATIONS

Microtranslator, Model 466 'Precision Laser & Optics Products', Newport Catalog.

Primary Examiner—Rodney H. Bonck
Assistant Examiner—Daniel Wittels
Attorney, Agent, or Firm—Amster, Rothstein & Ebenstein

[57] ABSTRACT

A durable, frictionless remote controlled manipulator, which is compact, stable, easy to construct, and has good dynamic capability, is a cradle suspension of lever arms, joined by crossed spring hinges to form a parallelogram suspension. The suspension creates vertical motions that have minimal cross-coupled horizontal error. Vertical cross-coupling error that arises at the extremes of parallelogram displacement in the two horizontal axes is hydraulically corrected by the remote controller. Thus, displacements are more nearly mutually perpendicular, and the position of the microtool more faithfully corresponds to the micromter settings. Being compact, the device can be mounted on a microscope stage to minimize cantilevering of the microtool, which is an unwanted source of vibration and also limits the load bearing in larger devices that can only be placed alongside the microscope.

18 Claims, 6 Drawing Sheets

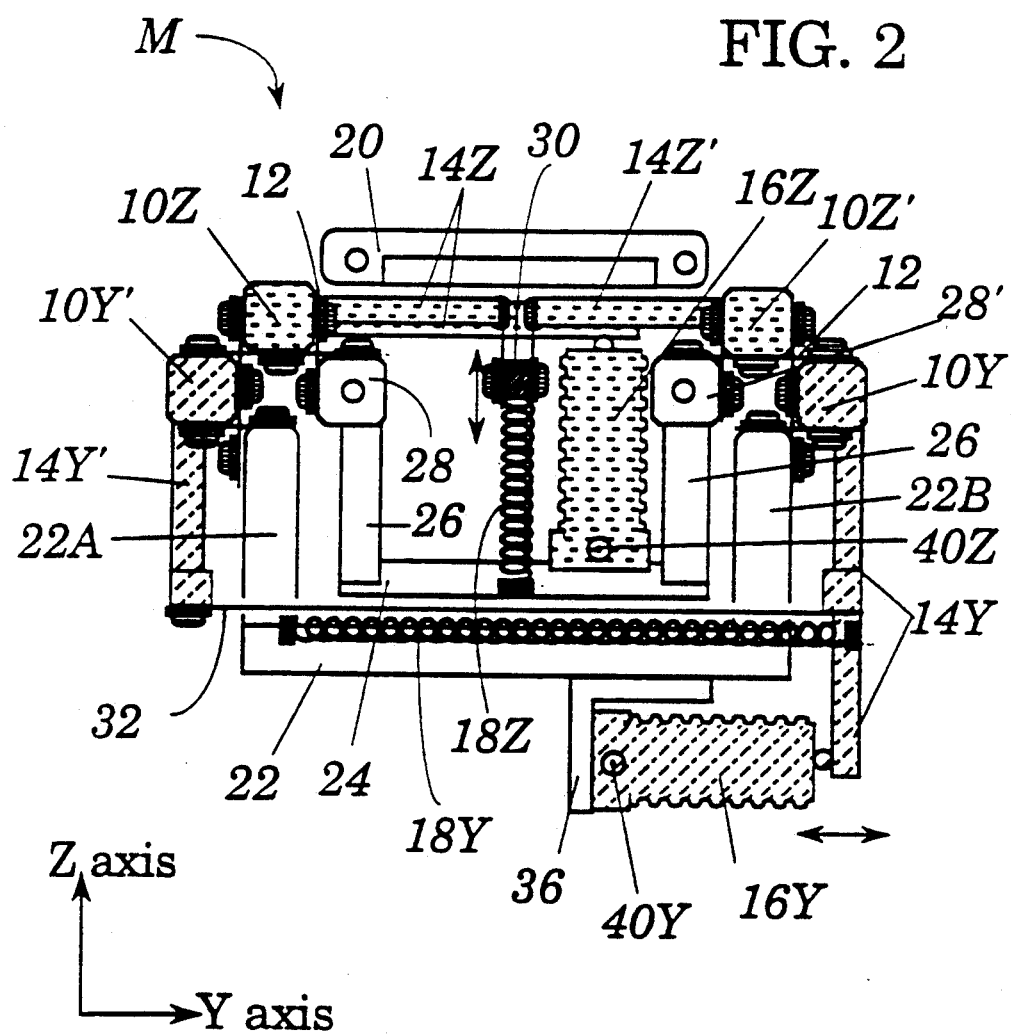

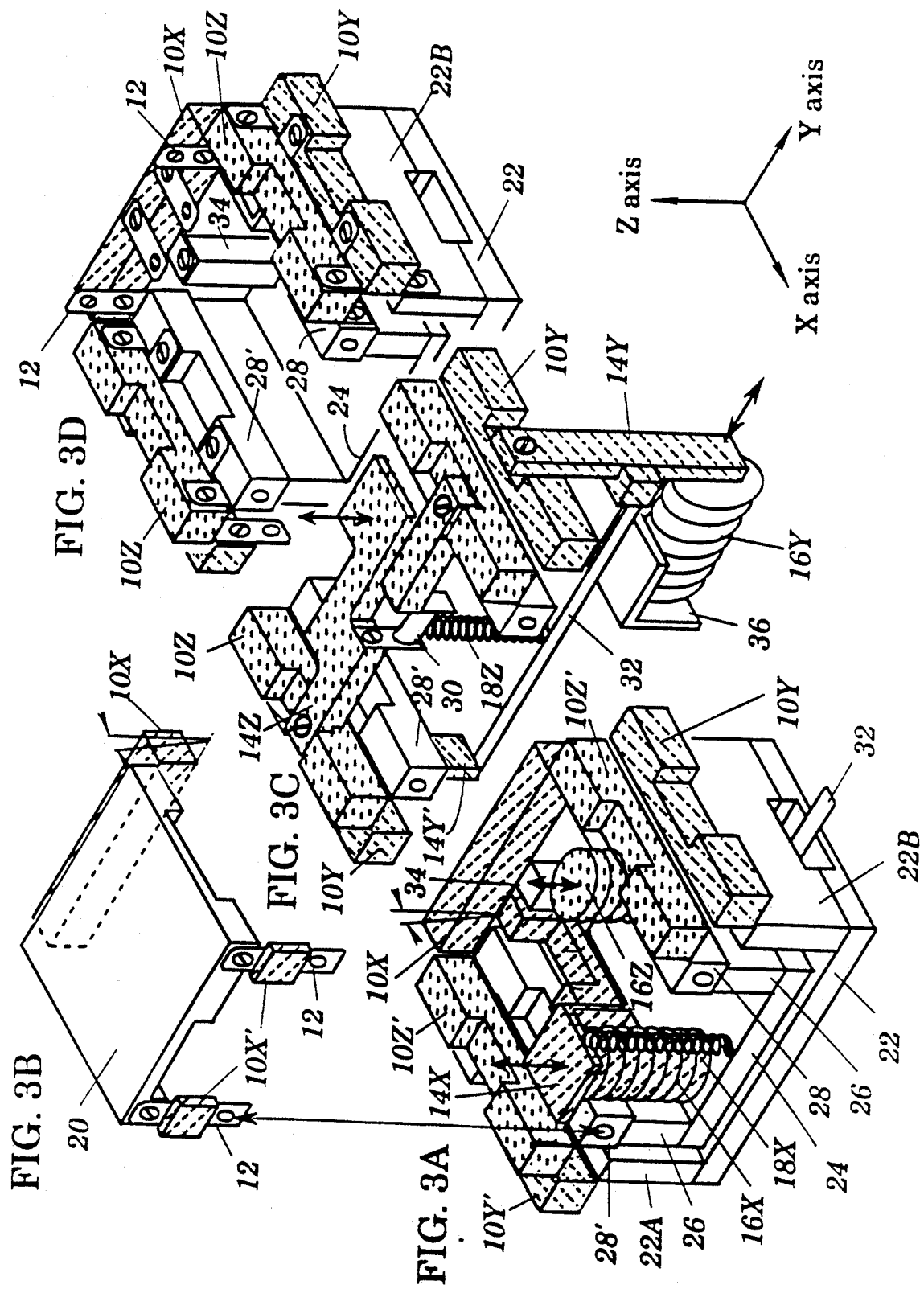

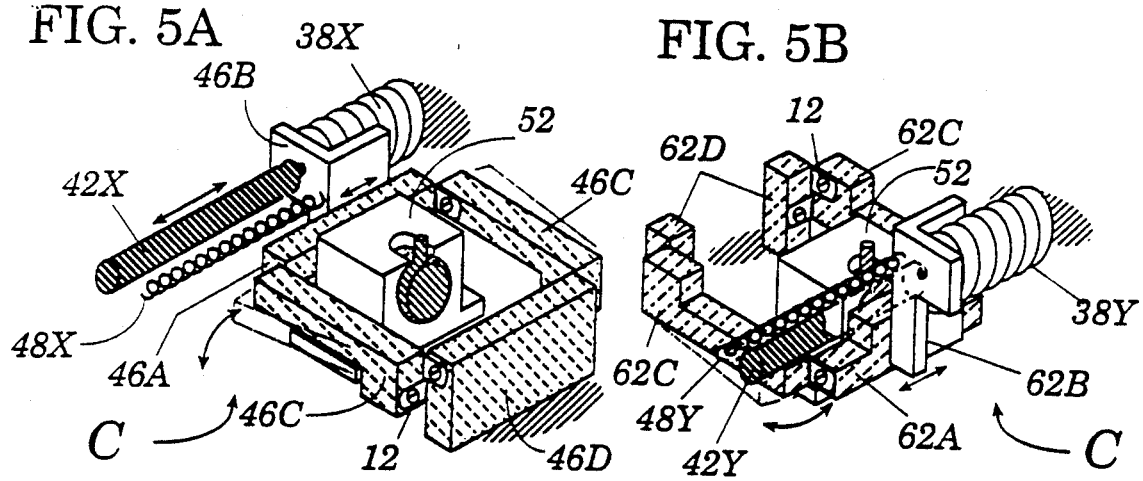

1

REMOTE CONTROLLED MICROMANIPULATOR

STATEMENT OF GOVERNMENT RIGHTS

This invention was made with Government support under Grant Nos. HL-21325 and HL-37412 awarded by the National Institute of Health. The Government has certain rights in the invention.

BACKGROUND OF THE INVENTION

The present invention relates to micromanipulators or micropositioners, and more particularly to a compact, remote controlled micromanipulator.

Parallelogram suspensions confer ease of construction, durability, and frictionless movements in micropositioning devices. However, displacements in the parallelogram suspensions move in arcs, so that an unwanted component of off-axis displacement or "cross-coupling error" exists that is orthogonal to the linear motion desired. Displacements in two dimensions will follow the surface of a sphere rather than a true plane—i.e., for horizontal motions, the position of the workpiece will fall below the horizontal plane at the extremes of displacement in either direction. Thus, when a microtool workpiece is moved either to or from the extremes in either horizontal axis, the displacement will move the microtool out of the narrow section of focus at the highest magnifications of the microscope. Since displacements must follow the tangent of the arc, motions between two axes are not truly orthogonal; vertical and horizontal actions will be mutually perpendicular only when the tangent of the spherical surface coincides with the horizontal plane. No exact correspondence exists between the change in the position of the microtool and the change in the settings on the remote micrometer, and so the device is not ideal for blind micropositioning.

Ball bearing slideways provide truly orthogonal motions, but they are subject to wear, effects of corrosion, and imperfections in manufacturing. Loads are always off-center with any kind of micromanipulator. Off-center loads create a moment that amplifies the force on the micromanipulator suspension, reducing the total load that can be borne. Thus a second problem with ball bearing suspensions is that the cantilever concentrates force and wear on the point contacts of a few ball bearings. For all kinds of suspensions, the existence of a large cantilever amplifies any cross-coupling errors and is thus both a potent source of pick-up for vibration during steady positioning and a source of unwanred oscillation during motions, i.e., acceleration of the workpiece. Thus it is desirable to reduce the size of the micromanipulator suspension, but this will exacerbate the cross-coupling errors of parallelogram suspensions because, when the dimensions of its lever arms are reduced to preserve the mechanical advantage, the curvatures of the parallelograms are increased.

Suspension of a load in a cantilever fashion creates a mechanical moment that favors rotation about a horizontal axis of the micromanipulator suspension. Horizontal stability in the parallelogram suspension of levers in the Huxley-style device is achieved by creating a counteracting moment, made large by increasing the vertical size of the device. The large size of these Huxley-style devices requires that they be placed alongside the microscope. They are too large to be stage mounted, as would be desired to reduce cantilevering of the workpiece.

A mechanical advantage is created by the levers in a Huxley-style device, but the length of the levers severely reduces the ability to rapidly advance a microtool, such rapid advancement being necessary to minimize damage to living cells during their impalement by the microtool. Rapid advancement can be achieved by including an additional piezoelectric device in the micromanipulator, but this remedy introduces its own problems: the piezoelectric device adds considerable mass to the micromanipulator, induces oscillations, is expensive, and introduces a source of electric noise into the experimental environment.

One advantage of the Huxley-style device is that the small size of its parallelogram suspension itself confers the large mechanical advantage in micromanipulation. Lever arms are integrated into the suspension, so that their action translates a large micrometer spindle displacement to a relatively small microtool displacement. The mechanical advantage, being created external to the suspension, reduces both the action and the load imposed upon the actuator, so that construction of precise actuators does not limit performance of the micromanipulator. Parallelogram suspensions have been devised in which the means of suspension confers no mechanical advantage, or actually decreases the mechanical advantage, of the micromanipulator's actuator elements. For example, De Fonbrune U.S. Pat. No. 1,987,733 describes a hydraulic micromanipulator that utilizes deformable boxes (FIGS. 11-14). The design provides only two-axis motion for a parallelogram suspension, and the force of displacement in the third axis is borne directly by the micromanipulator's actuator. In the De Fonbrune device, the site of action of the actuator element is placed between the fulcrum and the load so that the leverage created in the deformable box necessarily reduces the mechanical advantage of the suspension and amplifies the load imposed on the actuators.

Hall et al. U.S. Pat. No. 4,635,887 describes a micropositioner based upon a suspension that also appears to utilize a three-dimensional deformable box based on similar principles to those shown by De Fonbrune, although the displacements of the actuator are made equal to that of the deformable box. Since each actuator is directly linked to the base of each deformable parallelogram, no mechanical advantage is conferred by the suspension, and the load is directly borne by the actuator. Thus, the precision of manipulation requires construction of very precise actuators. Cross-coupling errors exists in either suspension, and they can be reduced only by increasing the size of the box to add unwanted bulk. The Hall et al. device is too large to place on a microscope stage, thereby requiring substantially cantilevering of the workpiece from an off-stage location.

Krueger U.S. Pat. No. 4,946,329, the substance of which is expressly incorporated herein by reference, discloses a remote controlled micromanipulator employing laterally intextensible metal bellows, connected by a flexible tubing of constant internal diameter, in both a micromaniputator and a remote controller. Variations of the length of one bellows is communicated to the other bellows by variations in hydraulic volume, as opposed to variations in hydraulic pressure. The Krueger micromanipulator permits making precise, reproducible microadjustments along three orthogonal axes in the position of a micromanipulator platform adapted to support a microtool for relative movement. The micromanipulator comprises a base plate, a platform, and means for operatively mounting the platform on the base plate for substantially orthogonal movement relative to the base plate. The mounting means includes, for each of the three orthogonal axes X, Y and Z, at least one pivotable bar, a displaceable lever arm fixedly secured to the bar for pivoting the bar, and an actuator bearing on the lever arm for displacing the lever arm relative to the base plate, and hence pivoting the bar to move the platform relative to the base plate. No means is provided, however, to compensate for the small cross-coupling errors which occur in one axis as a result of extreme displacements of the platform in either or both of the other axes. Accordingly, while the movement of the platform relative to the base plate is substantially orthogonal, it is not totally orthogonal. Further, while the preferred embodiments of the Krueger micromanipulator are compact, and can in particular instances be mounted on a microscope stage to minimize cantilevering of the microtool (thereby avoiding both an unwanted source of vibration and the limits on load bearing in large devices that can only be placed alongside the microscope), they are not as compact as desirable for easy mounting on a relatively small microscope stage.

Accordingly, an object of the present invention is to provide a durable, frictionless remote controlled micromanipulator having a parallelogram suspension.

Another object is to provide such a micromanipulator which has a compact suspension mountable on the state of a microscope.

A further object is to provide such a micromanipulator which gives rise to motions that are truly orthogonal and correspond faithfully to the settings on the micrometer spindles of the remote controller.

It is also an object of the present invention to provide such a micromanipulator wherein any vertical cross-coupling error that arises at the extremes of a parallelogram displacement of the two horizontal axes is hydraulically corrected by a remote controller.

It is another object to provide such a micromanipulator which is of simple and rugged construction, yet compact, stable and easy to construct, with good dynamic capability.

SUMMARY OF THE INVENTION

It has now been found that the above and related objects of the present invention are obtained by an improvement in a micromanipulator for making precise, reproducible microadjustments of the position of a platform adapted to support a microtool for relative movement. The micromanipulator comprises a base plate, a platform, and means for operatively mounting the platform on the base plate for substantially orthogonal movement relative to the base plate. The mounting means includes, for each of three orthogonal axes X, Y and Z, at least one pivotable bar, a displaceable lever arm fixedly secured to the bar for pivoting the bar, and an actuator bearing on the lever arm for displacing the lever arm relative to the base plate and hence pivoting the bar relative to the base plate. The improvement resides in the operative mounting means comprises a plurality of nested cradle assemblies.

The platform is preferably mounted on one of the nested cradle assemblies, and the one cradle assembly is mounted on the base plate (which is part of the other cradle assembly) at each end by spring hinges. The spring hinges on one side of the one cradle assembly are acted on by one set of Z- and Y-axis bars, and at the other side by another set of Z-and Y-axis bars. The platform is mounted on the one cradle assembly by spring hinges, at least some of which are acted on by the X-axis bar, and preferably the platform is mounted on the one cradle assembly by spring hinges acted on only by the X-axis bar. Typically the one cradle assembly is the inner cradle assembly, and the other cradle assembly is the outer cradle assembly.

In a preferred embodiment there are two of the bars for the vertical Z axis, the lever arm for the Z axis being rigidly connected to one of the Z-axis bars. The Z-axis bars are connected together by a linkage securing the two Z-axis bars together for pivoting in opposite directions. The linkage is preferably flexible, and the flexible connection is equidistantly disposed from the two Z-axis bars, thereby to reduce the width of the micromanipulator without sacrificing the mechanical advantage provided by the Z-axis lever arm. There are also two of the bars for the horizontal Y-axis and means operatively securing the Y-axis bars together for pivoting in the same direction. The securing means preferably comprises a non-extensible strap securing the Y-axis bars for cooperative movement to minimize cross-coupling error therein due to vertical displacement of the platform by equalizing rotational orientation of the Y-axis bars.

It is preferred that each of the actuators is rigidly anchored to the fulcrum across which its associated lever arm extends, thereby to prevent misalignment of the actuator during its actuation or by actuation of the actuators in other axes, and each of the lever arms is inwardly oriented from the point of contact with its respective bar, thereby to create a compact micromanipulator.

The present invention further encompasses such a micromanipulator in combination with a remote controller, the remote controller including compensating means to correct for cross-coupling errors in the vertical Z-axis occurring with extreme displacement of the platform in either or both of the horizontal X- and Y-axes. The compensating means in the remote controller is preferably a compensating actuator which responds independently to extremes of displacement in either or both of the X- and Y-axes. More particularly, the compensating actuator responds to extreme displacements in the X-axis by variations in the length thereof at one end and to extreme displacements in the Y-axis by variations in the length thereof at the other end.

BRIEF DESCRIPTION OF THE DRAWING

The above and related objects of the present invention will be more fully understood by reference to the following detailed description of the presently preferred, albeit illustrative, embodiments of the present invention when taken in conjunction when the accompanying drawing wherein:

FIG. 2 is a front elevation view of the remote controlled micromanipulator, showing the placement of two of the three actuators governing displacement, with the third or X-axis actuator and lever bar suspension removed for illustrative purposes;

FIG. 3A, 3B, 3C and 3D are exploded isometric representations of all of the components of the remote controlled micromanipulator suspension showing: (A) cradle suspensions and one horizontal axis (X-axis) lever arm assembly, (B) top plate assembly, (C) lever arm suspensions for the vertical axis (Z-axis) and the second horizontal axis (Y-axis), and (D) locations of remaining crossed spring hinges not shown in (B), with some of the components being illustrated in more than one view for expository purposes;

FIGS. 5A and 5B are exploded isometric representations of the separate parallelogram suspensions in the remote controller showing means for compensation for cross-coupling error in the X- and Y-axis, respectively; FIG. 5C, 5D and 5E are isometric representations of the means for sandwiching the compensating bellows between the same with placement of the micrometers, the details for housing and suspending the compensating bellows, and the compensating bellows itself, respectively.

Where possible, for expository purposes, components relating to X-axis, Y-axis and Z-axis displacements are designated by surfaces with solid lines tilting to the upper left, surfaces with solid lines tilting to the upper right, and surfaces with horizontal dashed lines, respectively.

DETAILED DESCRIPTION OF THE PREFERRED EMBODIMENTS

The Manipulator Structure

Figure 1A:
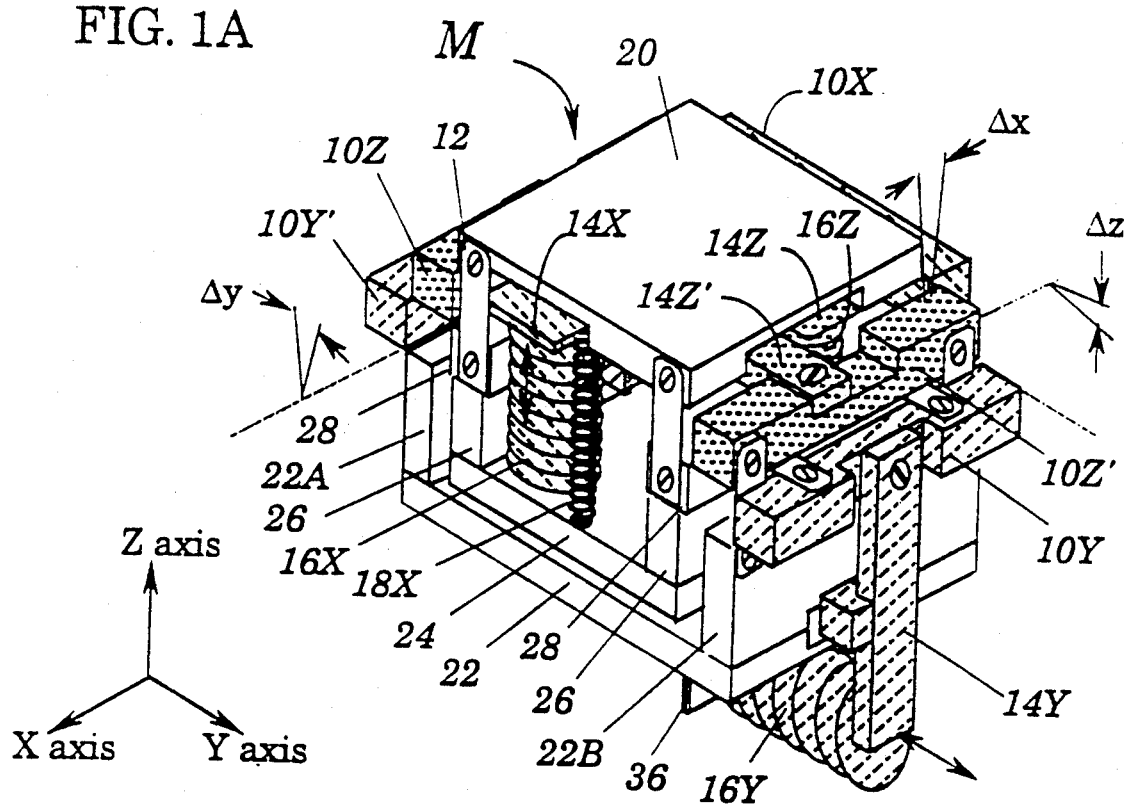
FIGS. 1A and 1B are isometric schematic views of the front and back, respectively, of a remote controlled micromanipulator according to the present invention.
Figure 1B:
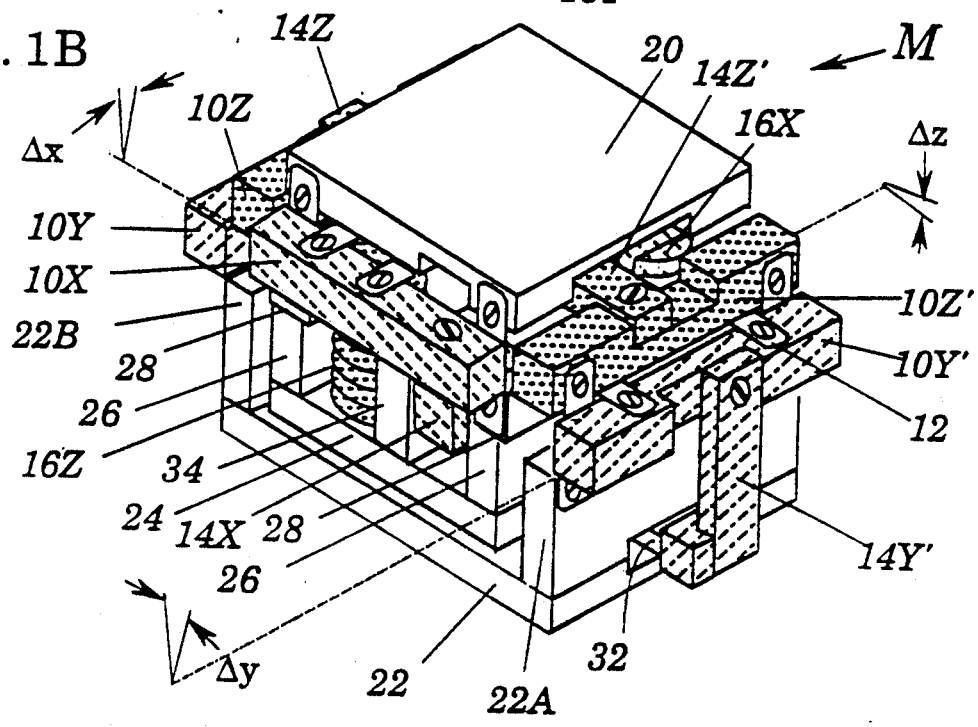

Referring now to the drawing and in particular to FIG. 1 thereof, therein illustrated are the general features of the micromanipulator suspension M. The micromanipulator M is an orthogonal assembly of three levers and fulcrums, each created by joining bevelled metal lever bars 10X, 10Y, 10Z with crossed spring hinges 12. Microscopic displacement is governed by axial rotation of a lever bar 10 by pivoting its respective lever arm 14X, 14Y, 14Z about the fulcrum. Displacements are created by three small actuators 16X, 16Y, 16Z for linear motion, which in a preferred embodiment are small metallic bellows filled with substantially incompressible fluid. Gravity and/or a coiled spring 18X, 18Y, 18Z under tension holds the end of each lever arm 14 against its respective actuator 16. The effect of extension of any actuator 16 is reduced by the mechanical advantage created by the length of the lever arm 14 on which it operates minus the width of the attached lever bar 10. Lever bar action is transmitted by the suspension described hereinbelow to cause the top plate 20 to move by a microscopic amount relative to the base frame 22 which supports the device. Microscopic displacements occur in three orthogonal axes X, Y, Z, corresponding to the two horizontal and single vertical components of displacement, respectively. Each actuator is secured to its fulcrum assembly to prevent misalignment of the actuator by the action of the other two actuators.

The details of the micromanipulator suspension M are shown in FIGS. 1-3. The inner element of the micromanipulator suspension is a rigid, vertical suspension or first cradle assembly consisting of a horizontal base 24 that securely seats the vertically oriented bellows 16X, 16Z. The first cradle assembly is completed by two vertical cradle sides 26, and two horizontally extending cradle support bars 28, 28'. The rigid cradle assembly is suspended at each support bar 28, 28' by two horizontally extending Z-axis lever bars 10Z, 10Z' whose axial rotations govern displacement in the vertical axis. Like but opposite rotation of these lever bars 10Z, 10Z' is established by two generally horizontal Z-axis lever arms 14Z, 14Z' that are connected at the center of the cradle suspension by a vertical lever arm coupling 30, such as a flexible connector (as illustrated) or a small ball bearing contact. This coupling 30 is located equidistant between the fulcrums for the Z-axis to pivot both Z-axis lever arms 14Z, 14Z' as determined by the action of the Z-axis bellows actuator 16Z. This bellows actuator 16Z acts directly on the primary vertical lever arm 14Z, the full length of which establishes the mechanical advantage of the fulcrum and is greater than the secondary vertical lever arm 14Z' (which is acted on by the bellows actuator 16Z only indirectly, through the primary vertical lever arm 14Z and coupling 30). The fulcrum is established where the Z-axis lever bars 10Z, 10Z' are in turn attached by spring hinges 12 to the support bars 28,28' of the first cradle assembly. The ends of each Z-axis lever bar are also attached by spring hinges 12 to a separate pair of horizontally extending Y-axis lever bars 10Y, 10Y' whose axial rotation governs displacements in one of the horizontal axes (the Y-axis).

Second fulcrums are established where the Y-axis lever bars 10Y, 10Y' are attached at their inner edge by spring hinges 12 to a second or outer rigid cradle assembly consisting of a horizontal base plate 22 and two vertical cradle base supports 22A, 22B. The first or inner cradle assembly is nested within and essentially supported by the second or outer cradle assembly. Axial rotation of each Y-axis lever bar 10Y, 10Y' is made identical by linking their lever arms 14Y, 14Y' with a long inelastic strap 32 that passes through a channel between the horizontal base 24 of the first cradle 24, 26, 28 (including 28') and the horizontal base plate 22 of the second cradle assembly 22, 22A, 22B.

Referring now in particular to FIG. 3, which is an exploded isometric schematic showing the disposition of all elements in the remote controlled micromanipulator suspension M (with some components being illustrated several times to more clearly show how different components are functionally linked together), the horizontal top plate 20 of the micromanipulator is attached to the vertical suspension cradle bars 28, 28' of the first cradle assembly by spring hinges 12 that establish a third fulcrum oriented orthogonally to the previous two, which third fulcrum governs displacement in the second horizontal axis (the X-axis). The vertically oriented bellows actuator 16X, the assembly consisting of the generally horizontal X-axis lever arm 14X, its horizontal lever bar 10X, and a lever bar support 34 that anchors the X-axis fulcrum to the cradle base 24 of the first cradle assembly 24, 26, 28, 28', all govern displacements in the X-axis.

Due to the central coupling 30, the Z-axis lever bars 10Z, 10Z' always rotate in opposite directions, whereas the Y-axis lever bars 10Y, 10Y. always rotate in the same direction. The flexible coupling between the Z-axis lever arms 14Z, 14Z' permits reduction of the dimensions of the cradle assembly (and hence the "footprints" of the manipulator) by reducing the separation required between the cradle support bars 28, 28' where the fulcrum for the vertical axis occurs. The cross spring hinges 12 attached to the illustrated coupling 30 are sufficiently stiff so as to prevent sway caused by any force that would rotate the Z-axis lever bars in the same direction. A preferred flexible coupling is constructed from two spring hinges 12, one being secured to each primary and auxiliary Z-axis lever arm 14Z, 14Z' and linked centrally by a short rigid spacer that is pulled downward by a coiled spring 18Z under tension, the coiled spring 18Z being attached to the first cradle base 24. Alternately, a direct ball bearing contact (not shown) that is positioned equidistant between centrally overlapping ends of the primary and auxiliary Z-axis lever arms 14Z, 14Z' could be used. In this case the coiled spring 18Z would be attached under tension to the overlapping extension of the auxiliary lever arm 14Z', the latter being the uppermost element. With either coupling, downward motion of the auxiliary lever arm 14Z' is opposed via the junction with the primary lever bar 14Z, which in turn is held by the upward force generated by the Z-axis actuator 16Z.

Mode of Micromanipulator Displacement

Referring to FIGS. 2 and 3C, the Y-axis actuator 16Y is secured to the frame base plate 22 by an angle bracket 36. Extension of the Y-axis actuator 16Y causes a displacement of the free end of the Y-axis lever arm 14Y, which pivots about its fulcrum to cause axial rotation of the associated Y-axis lever bars 10Y, 10Y' about the same fulcrum. The rotation of the Y-axis lever bars 10Y, 10Y' horizontally translates the ensemble of Z-axis lever bars 10Z, 10Z', the first cradle assembly 24, 26, 28, and the attached top plate 20. The whole assembly is made rigid by fixation of the Z-axis lever arm 14Z by its bellows 16Z, and so the Y-axis auxiliary lever bar 10Y' rotates by the same degree as the Y-axis lever bar 10Y. In addition, the primary Y-axis lever arm 14Y is linked to the auxiliary Y-axis lever arm 14Y' for movement as a unit by an non-extensible strap 32 extending across the rigid base plate 22 of second cradle assembly 22, 22A, 22B. Consequently, the auxiliary Y-axis lever bar 10Y' also rotates by a like degree when the full assembly consisting of the inner suspension cradle 24, 26, 28 and the Z-axis lever bars 10Z, 10Z' is distorted by Z-axis lever action. A simple parallelogram suspension is thus established that governs displacement by parallelogram action in the horizontal Y-axis of the top plate 20 of the device relative to the base plate 22 of the second cradle assembly 22, 22A, 22B.

Displacement in the other horizontal axis X is by similar action. Referring now to FIGS. 1 and 3A-B, the top plate 20 of the micromanipulator is attached at its four corners to the support bars 28, 28" of the first cradle assembly 24, 26, 28, 28'. Extension of the X-axis bellows actuator 16X displaces the X-axis lever arm 14X, thereby rotation of the X-axis lever bar 10X relative to the ends of the cradle support bars 28, 28' of the first cradle assembly. Consequently, the top plate 20 of the device translates horizontally along the X-axis by parallelogram action with respect to the first suspension cradle assembly 24, 26, 28.

In a fashion similar to the other axes, the linkage of the crossed spring hinges 12 to the top plate 20 can be strengthened by use of optional auxiliary X-axis lever bar elements 10X' (illustrated in FIG. 3B only). Such optional auxiliary lever bar elements 10X' minimize distortion of the spring hinge 1 under compressive loads and equalizes bending of the spring hinges 12 on either side of the top plate 20 to make the action equal on either side of the parallelogram suspension.

Since the Y-axis and Z-axis fulcrums are parallel, rotation of one of either axis's lever bars 10Y and 10Z necessarily contributes an unwanted orthogonal component of displacement along the other's axis. The orientation of the fulcrum governing the displacement in the X-axis is orthogonal to the fulcrum for the Z-axis. Displacement about the fulcrum in the Z-axis does not create a component of displacement in X-axis. In addition, since the Y-axis fulcrum is orthogonal to the X-axis fulcrum, rotation of one of either horizontal axis's lever bars 10X or 10Y does not contribute a component of error along the other horizontal axis. However the unwanted consequence of the parallelogram suspensions, as previously described, is that a displacement in either horizontal axis independently contributes a small component of downward displacement, or a 'cross-coupled' off-axis error, in the vertical direction. A design of the remote controller that can compensate for the vertical cross-coupling error is discussed hereinbelow.

From the preceding, it should be evident that actions in the Y-axis and X-axis can create components of cross coupling error only in the Z-axis, while actions in Z-axis can create components of cross coupling error only in the Y-axis. However, vertical or Z-axis displacement is governed by opposing parallelogram suspensions in which off-axis cross-coupling errors cancel. Referring now to FIGS. 1-3, extension of the Z-axis bellows 16Z lifts the first cradle assembly 24, 26, 28, increasing the separation between the top plate 20 and the base plate 22 of the second cradle assembly 22, 22A, 22B. Since the first cradle assembly 24, 26, 28 is rigid, rotation of the Z-axis lever bars 10Z, 10Z' in opposite directions by tilting the lever arms 14Z, 14Z' away from the horizontal slightly decreases the separation between the two junctions where each Z-axis lever bar 10Z, 10Z' is joined to its respective Y-axis bar 10Y,10Y'. As the separation between the two Y-axis fulcrums remains fixed, the actions in the Z-axis (vertical) would create an unwanted horizontal component of displacement in the Y-axis if its auxiliary lever bar 10Y' were free to rotate more than the primary lever bar 10Y in compensation. The unwanted additional rotation of the Y-axis auxiliary lever arm 10Y' is prevented, however, by the non-extensible strap 32 (e.g., a metal strap) that is linked to the primary Y-axis lever arm 10Y at the opposite end of the device. Consequently, the small components of opposite horizontal displacement of the Z-axis lever bars 10Z, 10Z' are cancelled out, being forced to be symmetrically distributed on opposite sides of the first cradle assembly 24, 26, 28. As these unwanted components are small, and the respective cradle assemblies 22, 22A, 22B and 24, 26, 28 are rigid, there is no noticeable resistance to the desired action in the vertical direction. Unlike the parallelogram error associated with displacement in the horizontal axis, vertical displacement is more truly orthogonal with little off-axis component of horizontal error.

It will be apparent that an important feature of the disposition of lever bars 10, lever arms 14, and actuators 16 is that each actuator is completely integrated within the respective fulcrum assembly across which it acts. Notably, the actuator 16X governing the X-axis displacement is secured to the cradle base 24, which is rigidly held in the same position relative to the X-axis fulcrum that is located at the ends of the cradle base support bars 28, 28'. On the other side of the fulcrum, the X-axis lever arm 14X is linked directly to the movable end of its actuator 16X. In a similar fashion, the Y-axis actuator 16Y is anchored by bracket 36 to the cradle base 22, the rigid extensions 22A, 22B of which support the fulcrum for the Y-axis motions. On the other side of the fulcrum, the Y-axis lower bars 10Y and lever arm 14Y are the only links to the movable end of the actuator 16Y. Concerning the Z-axis, its actuator 16Z is secured to the inner or first cradle base 24, rigid extensions 26, 28 of which are linked to the Z-axis fulcrum. On the other side of the fulcrum, the Z-axis lever arm 14Z is linked directly to the movable ends of its actuator 16Z. In all cases it should be apparent that no element governing displacement in another axis is interposed between a given actuator and the fulcrum across which it acts. Thus the actuators remain aligned with their respective lever arms, irrespective of manipulator-caused displacements in the other axes.

Referring now to FIGS. 4 and 5, therein illustrated is a remote controller C. The length of the hydraulic actuator units 16X, 16Y, 16Z in the micromanipulator M is governed by paired drive units 38X, 38Y, 38Z (which are also hydraulic actuators) that are secured to the frame 44 of the remote controller C. The length of each drive unit 38X, 38Y, 38Z in the remote controller is established by a micrometer spindle 42X, 42Y, 42Z that is also secured to frame 44 of the remote controller.

Compensation for Vertical Cross-Coupling Error by the Remote Controller

Referring now to FIG. 5, therein illustrated is the mechanism in the remote controller that compensates for the vertical cross-coupling error associated with the micromanipulator's parallelogram suspension. Referring in particular to FIG. 5A, therein illustrated are the linkages in the remote controller for governing X-axis displacement. A first parallelogram suspension generally designated 46 is disposed below the horizontal drive bellows 38X and 38Y in the remote controller. The parallelogram suspension consists of a freely translating member 46A with a firmly affixed bracket 46B, two arms 46C which establish the sides of the parallelogram, and an anchor 46D which serves as the stationary base 46D of the parallelogram suspension 46 and fixedly links it to the frame 44 of the remote controller. All members of the suspension 46 are joined by crossed spring hinges 12.

The bracket 46B that is firmly affixed to the translating member 46A for movement therewith is held between the moveable end of the drive actuator 38X and the rotating micrometer spindle 42X governing displacements in the X axis. A coiled spring 48X under tension pulls bracket 46B against the micrometer spindle 42X. It is advantageous also to secure the top piece 38B of the bellows drive unit 38X to the bracket 46B. In this way, the coiled spring 38X provides tension that assists in overcoming the force of extension of metallic bellows 38X and, simultaneously, in overcoming the force of compression of the associated hydraulic actuator 16X in the micromanipulator suspension. Spring 18X (see FIG. 1) under tension in the micromanipulator suspension has the same effect.

As the micrometer spindle 42X compresses or extends the drive bellows 38X, the translating member 46A is forced to displace in an arc whose radius is determined by the length of arms 46C, each of the latter rotating about its respective pivot at the junction with the anchor 46D.

Referring now to FIG. 5D, a compensating hydraulic bellows unit 50 is orthogonally disposed to the principal axis of translation of the parallelogram's translating member 46A. The effective cross section of the compensating bellows unit 50 is dimensionally equivalent to the effective cross section of each drive bellows 38 in the remote controller. The compensating bellows 50 is suspended in a manner which allows one degree of freedom via a through-hole machined in a compensator housing 52, with an 0-ring 54 snugly fit between the outer diameter of each bellows endpiece 50B, 50C and the inner diameter of the through-hole in bellows housing 52. The endpiece 50B of the compensating bellows unit 50 projects from the housing 52 and is pressed by fluid pressure against the side of the translating member 46A. A direct sliding contact between the bellows endpiece 50B and the translating arm 46A is prevented by a non-translating slip plate 56X constructed from a sheet of stainless steel.

The opposite endpiece 50C of the compensating bellows unit 50 projects a small distance from the other end of the bellows housing 52 and abuts in a similar fashion against the translating arm 62A of a second parallelogram suspension generally designated 62 that is linked to the bellows drive unit controlling displacements in the Y axis. The means of linkage is analogous to that just described for the X axis. Referring now to FIG. 5B, a parallelogram suspension 62 is disposed below the horizontal drive bellows 38X and 38Y in the remote controller. The parallelogram consists of a freely translating member 62A with a firmly affixed bracket 62B from movement therewith, two arms 62C which establish the sides of the parallelogram, and two anchors 62D which serve as the stationary base of the parallelogram suspension 62 and fixedly link it to the frame 44 of the remote controller. As the Y-axis micrometer spindle 42Y compresses or extends the Y-axis drive bellows 38Y, the translating member 62A is forced to displace in an arc whose radius is determined by the length of arms 62C as each of the latter rotates about its respective pivot at the junction with the anchor 62D. As before, the compensating bellows unit 50 is orthogonally disposed to the principal axis of translation of the parallelogram's translating member 62A.

As is evident in FIG. 5C, the components of the two parallelogram suspensions 42, 62 are constructed in a complementary fashion such that they can be interposed for compactness. Namely, the translating member 46A of the first parallelogram suspension fits between the compensating bellows housing 52 and the base support 62D for the second parallelogram. Conversely, the translating member 62A of the second parallelogram suspension fits between the compensating bellows housing 52 and the base support 46D for the first parallelogram suspension. In this manner, the ends of the compensating bellows unit 50 are held by internal hydraulic pressure against a compact sandwich consisting of the translating arms 46A, 62A of the respective parallelogram suspensions 46, 62.

Referring still to FIG. 5C, therein illustrated is the operation of the parallelogram suspensions 42,62 in the remote controller C as the means for compensation for the cross-coupling errors in the micromanipulator M. When the X-axis bellows drive unit 38X is either compressed or extended beyond its neutral position corresponding to the maximum height of its parallelogram suspension 46, the height of the parallelogram 46 decreases and further compresses the compensating bellows unit 50. The other end of the compensating bellows unit is held fixed since member 62A does not change its position without simultaneous displacements in the Y axis, and thus fluid is expelled from the compensating bellows 50 via non-extensible hydraulic line 70 (see arrow 70') through a tee connection 72, to the hydraulic lines 40Z governing extension of the Z-axis actuator 16Z (see FIG. 4B) in the micromanipulator. Similarly, when the Y-axis bellows drive unit 38Y is either compressed or extended beyond its neutral position corresponding to the maximum height of its parallelogram suspension 62, the height of the parallelogram 62 decreases and further compresses the compensating bellows unit 50. Without simultaneous displacements in the X axis, the other end of the compensating bellows unit 50 is held fixed by translating member 46A, and thus fluid is expelled from the compensating bellows unit 50 via non-extensible hydraulic line 70 (see arrow 70°), through a tee connection 72, into the hydraulic lines 40Z governing extension of the Z-axis actuator 16Z in the micromanipulator. Thus, sandwiching the compensating bellows drive unit 50 between the separate parallelogram suspensions 42, 62 permits compensation for vertical cross-coupling error for each horizontal axis independently of the other.

Figure 6:
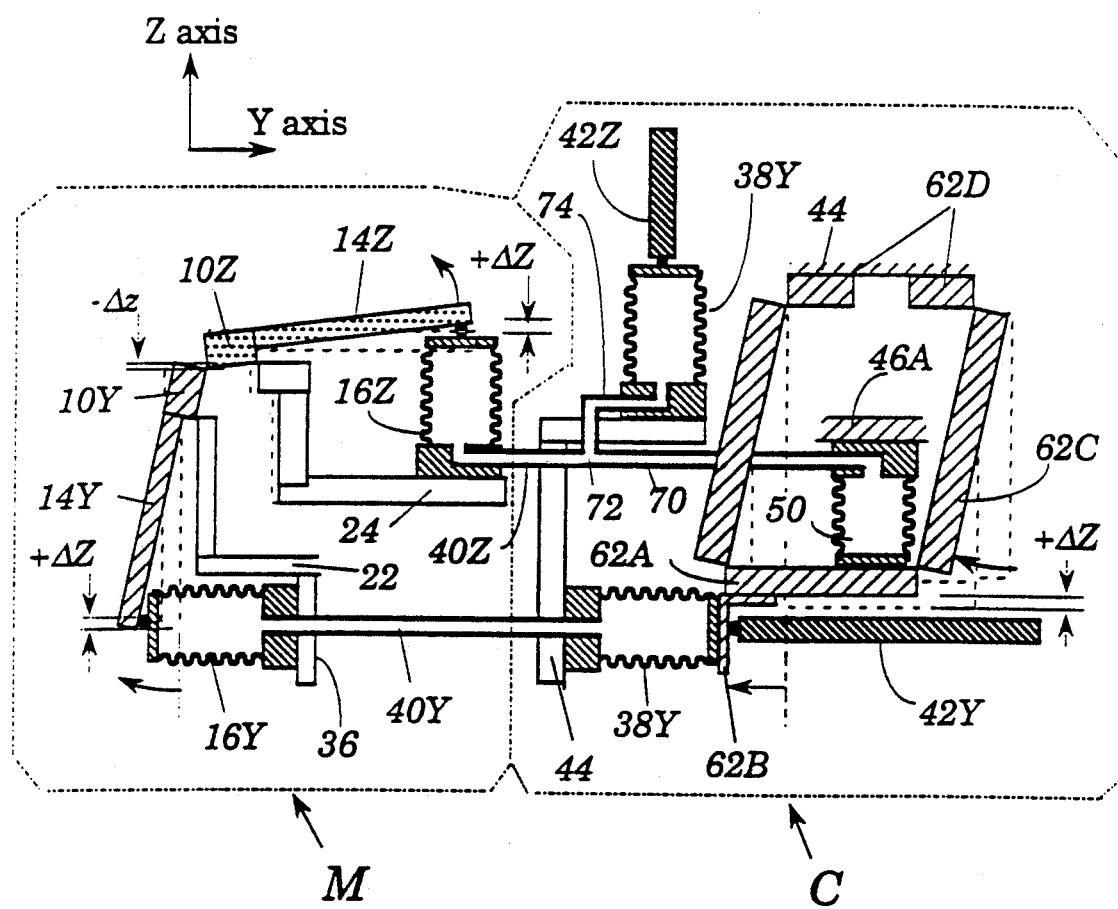
FIG. 6 is a schematic representation of the hydraulic connections between the actuators, drive units, and compensating bellows, and their functioning in the mechanism of compensation by the remote controller for vertical cross-coupling errors in one of the parallelogram suspensions of the micromanipulator.

The mechanism for compensation for vertical cross-coupling errors in the micromanipulator's parallelogram suspensions is now explained with reference to FIG. 6, a partial functional schematic of the micromanipulator M and remote controller C together. Compensation is based on the fact that unwanted downward vertical error associated with the top plate 20 of the micromanipulator ($-Dz$) is always proportional to the upward larger component of displacement ($+Dz$) at the opposite end of a lever arm 14X, 16Y that governs a horizontal axis of displacement, and the fact that the ratio of $Dz/DZ$ must equal the mechanical advantage conferred by the micromanipulator's suspension. Consider the displacements in one axis, say the Y axis. Starting with the remote controller, movement of the Y-axis micrometer spindle 42Y compresses the drive actuator 38Y. This action displaces fluid through the hydraulic tubing 40Y, which causes a proportional extension in the Y-axis actuator 16Y in the micromanipulator. This action has the desired effect of horizontally displacing the first or vertical suspension cradle 24, 26, 28, 28' and top plate 20 of the micromanipulator by an extent reduced by the mechanical advantage established by the leverage in the micromanipulator suspension, which for illustration is 1:5. However, the same action also creates an unwanted downward deflection ($-Dz$) of the top plate 20 due to cross-coupling in the parallelogram suspension.

Due to mechanical similarity, it can be seen that any vertical error in micromanipulation ($-Dz$) is also in the same proportion (1:5) to a larger component of vertical deflection ($+DZ$) at the end of the lever arm 14Y, caused by its arc of rotation about its fulcrum. Since displacement of both the actuator unit 16Y in the micromanipulator and the drive unit 38Y are hydraulically coupled, the vertical deflection $+DZ$ of the arc at the end of the lever arm 14Y is equal to the cross-coupled parallelogram deflection of lever arms 62C of similar length in the remote controller. The component of deflection ($+DZ$) is transmitted to the compensating bellows unit 50 which is positioned to detect the component of displacement of the arc from the orthogonal axis. The compensating bellows accordingly pumps a volume of fluid into the hydraulic lines 70, 40Z governing displacements in the Z axis. As the cross sections of the drive units 38 and the compensating bellows unit 50 are equal, the increment in the hydraulic volume is equivalent to an extension of the 5 times the original vertical error due to cross-coupling ($+DZ = +5Dz$).

Since the Z-axis drive actuator 38Z is held at constant length by its micrometer spindle 42D in the remote controller, this volume of fluid is transferred directly to the Z-axis actuator 16Z in the micromanipulator. The extension of the Z-axis actuator bellows 16Z, proportional to the larger component of displacement ($+DZ$) is reduced by same mechanical advantage—i.e., by the 1:5 leverage in the micromanipulator. Thus, the top plate 20 of the micromanipulator is lifted by an amount ($+Dz$) which exactly compensates for the initial downward deflection of ($-Dz$) due to cross-coupled error in the parallelogram suspension.

Due to the arc of the parallelogram suspension, a like error occurs, in the opposite direction of horizontal displacement, just as if the drive bellows 38Y were extended and the actuator unit were compressed. By similar reasoning, it can be seen that vertical components are compensated for in a like fashion for the other axis of horizontal displacement (the X axis).

Finally, error correction requires that the cross-section of the compensating bellows unit 50 be identical to all other drive units 38 in the remote controller. Similarly, the cross sections of all actuator bellows units 16 in the micromanipulator must also be equal to each other. However, the compensation method permits the cross section of the bellows actuators 16 in the manipulator M to differ from that used in the drive units 38 in the remote controller C as a means for augmenting the original mechanical advantage conferred by the manipulator levers. In this case, the lengths of the elements $L_c$ determining the height of the parallelogram suspensions 62C and 46C in the remote controller are adjusted according to the relation:

$$L_c = L_m(A_m/A_c)^2,$$

where $L_m$ is the length of the lever arms in the micromanipulator, and $A_m$ and $A_c$ represent the cross-sectional area of the hydraulic bellows in the manipulator M and the remote controller C, respectively.

The Actuator Units

Figure 4A:
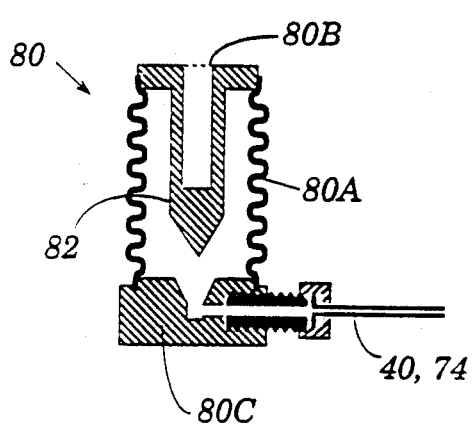
FIG. 4A is a side elevational schematic representation of a hydraulic bellows for use as an actuator, a drive unit, or a compensating bellows unit.
Figure 4B:
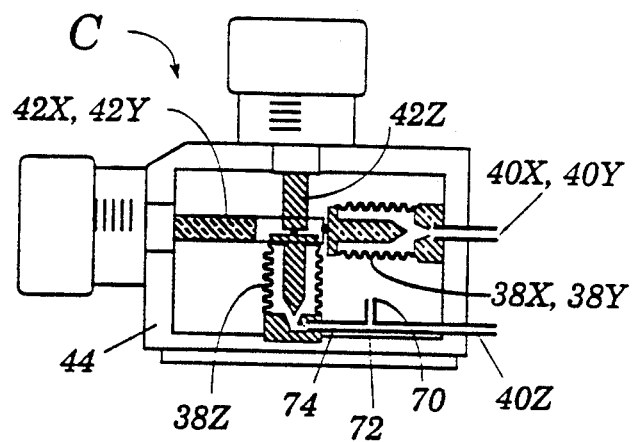
FIG. 4B is an elevational schematic representation of the remote controller for the micromanipulator, illustrating the placement of the micrometers and the drive units and their mounting to the frame of the remote controller.

Referring now to FIG. 4A, therein illustrated is a preferred hydraulic bellows unit 80 for use in the present invention as an actuator, whether it be an actuator unit 16 in the micromanipulator M, a drive unit 38 in the remote controller C, or a compensating bellows unit 50 in the remote controller C. Each hydraulic actuator unit 80 is constructed from a small, commercially available, nickel-plated metallic bellows 80A that is soldered to brass end pieces 80B and 80C. Referring now to FIG. 4B as well, the length of each hydraulic bellows unit 80 serving as an actuator unit 16X, 16Y, 16Z in the micromanipulator suspension is governed by respective hydraulic bellows units serving as a drive unit 38X, 38Y, 38Z located in a remote controller C, where direct fluid connection is established by non-extensible hydraulic tubing 40X, 40Y, 40Z.

The top piece 80B of each unit preferably contains a machined extension 82 that reduces the fluid volume of the bellows by about 30% and fits into a recess tooled into the bottom piece 80C. As a protective measure, the machined extension 82 also prevents over-compression of the bellows 80 beyond its recommended range and catastrophic buckling of the unit under extreme force. Thus, another consequence of the machined extension 82 of the end piece 80B is that, by limiting compression in one bellows (e.g., drive unit 38 in the remote controller), unwanted over-extension of the paired unit (e.g., actuator unit 16 in the micromanipulator) is also prevented.

The end fittings providing fluid communication for the bellows units 80 may project either laterally (as illustrated for hydraulic actuator units 16X, 16Y, 16B and drive unit 38Z) to conserve space, or axially (as illustrated for drive units 38X, 38Y) to permit the end fitting to also serve as the mechanism for securing the bellows to the frame 44 and thus reduce the required number of connections in the hydraulic tubing.

It will be appreciated that preferably, although not necessarily, the micromanipulator M of the present invention will be utilized in an inverted position relative to that illustrated in the drawing, the position illustrated in the drawing being selected merely to facilitate exposition of the invention.

To summarize, the present invention provides a durable, frictionless remote controlled micromanipulator having a parallelogram suspension, the micromanipulator being easily mountable on the stage of a microscope. The micromanipulator gives rise to motions that are truly orthogonal and correspond faithfully to the settings on the micrometer spindles on the remote controller, thereby rendering it useful as a micropositioner. Any vertical cross-coupling error that arises at the extremes of a parallelogram displacement along the two horizontal axes is hydraulically corrected by the remote controller. Finally, the micromanipulator is of simple, rugged construction, yet compact, stable and easy to construct with good dynamic ability.

More particularly, the micromanipulator utilizes nested cradles to create a stable horizontal suspension that is compact and provides a low profile. A central linkage of the two Z-axis lever arms reduces the total width or footprint of the suspension, while preserving the mechanical advantages of the lever arms. The two Y-axis lever arms are strapped together so that minimal horizontal cross-coupling errors occur with a vertical displacement. The remote controller corrects the vertical cross coupling errors by providing a compensating bellows that is sandwiched between two independently acting parallelogram suspensions which link the compression of the compensating bellows to separate displacements along either or both horizontal axes.

Now that the preferred embodiments of the present invention have been shown and described in detail, various modifications and improvements thereon will become readily apparent to those skilled in the art. Accordingly, the present invention is to be construed broadly in a manner consistent with the spirit and scope of the invention described herein.

I claim:

1. In a micromanipulator for making precise, reproducible microadjustments of the position of a platform adapted to support a microtool for relative movement, the micromanipulator comprising:
   (A) a base plate,
   (B) a platform, and
   (C) means for operatively mounting said platform on said base plate for substantially orthogonal movement relative to said base plate, said mounting means including for each of three orthogonal axes X, Y and Z:
      (i) at least one pivotable bar,
      (ii) a displaceable lever arm fixedly secured to said bar for pivoting said bar, and
      (iii) an actuator bearing on said lever arm for displacing said lever arm relative to said base plate and hence pivoting said bar relative to said base plate;
   the improvement wherein said operative mounting means comprises a plurality of nested cradle assemblies.

2. The micromanipulator of claim 1 wherein there are two of said bars for the horizontal Y-axis and means operatively securing said Y-axis bars together for pivoting in the same direction.

3. The micromanipulator of claim 2 wherein said securing means comprises a non-extensible strap securing said Y-axis bars for cooperative movement to minimize cross-coupling error therein due to vertical displacement of the platform by equalizing rotational orientation of said Y-axis bars.

4. The micromanipulator of claim 1 in combination with a remote controller, said remote controller including compensating means to collect for cross-coupling errors in the vertical Z-axis occurring with extreme displacement of said platform in either or both of the horizontal X- and Y-axes.

5. The micromanipulator of claim 4 wherein said compensating means in said remote controller is a compensating actuator which responds independently to extremes of displacement in either or both of the X- and Y-axes.

6. The micromanipulator of claim 5 wherein said compensating actuator responds to extreme displacements in the X-axis by variations in the length thereof at one end and to extreme displacements in the Y-axis by variations in the length thereof at the other end.

7. The micromanipulator of claim 1 wherein each of said actuators is rigidly anchored to the fulcrum across which its associated lever arm extends, thereby to prevent misalignment of an actuator during actuation of any of said actuators, and each of said lever arms is inwardly oriented from the point of contact with its respective bar, thereby to create a compact micromanipulator.

8. The micromanipulator of claim 1 wherein an inner one of said plurality of nested cradle assemblies is disposed within and supported by an outer one of said plurality of nested cradle assemblies.

9. The micromanipulator of claim 1 wherein, for two of said orthogonal axes, said lever arms are fixedly secured to said respective bars for pivoting said bars about points disposed in a first plane, and for the third of said orthogonal axes, said lever arm is fixedly secured to said bar for pivoting said bar about a point disposed in a second plane, said first and second planes being co-parallel and separated by only the width of one of said bars.

10. In a micromanipulator for making precise, reproducible microadjustments of the position of a platform adapted to support a microtool for relative movement, the micromanipulator comprising:
   (A) a base plate;
   (B) a platform; and (C) mean for operatively mounting said platform on said base plate for substantially orthogonal movement relative to said base plate, said mounting means including for each of three orthogonal axes X, Y and Z:
(i) at least one pivotable bar,
(ii) a displaceable lever arm fixedly secured to said bar for pivoting said bar, and
(iii) an actuator bearing on said lever arm for displacing said lever arm relative to said base plate and hence pivoting said bar relative to said base plate;
the improvement wherein said operative mounting means comprises a plurality of nested cradle assemblies, and wherein there are two of said bars for the vertical Z-axis, said lever arm for the Z-axis is rigidly connected to one of said Z-axis bars, and said Z-axis bars are connected together by a linkage securing the two Z-axis bars together for pivoting in opposite directions.

11. The micromanipulator of claim 10 wherein said linkage is flexible.

12. The micromanipulator of claim 11 wherein said flexible connection is equidistantly disposed from said two Z-axis bars, thereby to reduce the width of said micromanipulator without sacrificing the mechanical advantage provided by the Z-axis lever arm.

13. In a micromanipulator for making precise, reproducible microadjustments of the position of a platform adapted to support a microtool for relative movement, the micromanipulator comprising:
(A) a base plate,
(B) a platform, and
(C) means for operatively mounting said platform on said base plate for substantially orthogonal movement relative to said base plate, said mounting means including for each of three orthogonal axes X, Y and Z:
(i) at least one pivotable bar,
(ii) a displaceable lever arm fixedly secured to said bar for pivoting said bar, and
(iii) an actuator bearing on said lever arm for displacing said lever arm relative to said base plate and hence pivoting said bar relative to said base plate;
the improvement wherein said operative mounting means comprises a plurality of nexted cradle assemblies, and wherein said platform is mounted on one of said nested cradle assemblies, and said one cradle assembly is mounted on said base plate at each end by spring hinges, said spring hinges on one side of said one cradle assembly being acted on by one set of Z- and Y-axis bars, and on the other side by another set of Z- and Y-axis bars.

14. The micromanipulator of claim 13 wherein said platform is mounted on said one cradle assembly by spring hinges, at least some of which are acted on by the bar for said X-axis.

15. The micromanipulator of claim 14 wherein said platform is mounted on said one cradle assembly by spring hinges acted on only by the bar for said X-axis.

16. In a micromanipulator for making precise, microadjustments of the position of a platform adapted to support a microtool for relative movement, the micromanipulator comprising:
(A) a base plate,
(B) a platform, and
(C) means for operatively mounting said platform on said base plate for substantially orthogonal movement relative to said base plate, said mounting means including for each of three orthogonal axes X, Y and Z:
(i) at least one pivotable bar,
(ii) a displaceable lever arm fixedly secured to said bar for pivoting said bar, and
(iii) an actuator bearing on said lever arm for displacing said lever arm relative to said base plate and hence pivoting said bar relative to said base plate;
the improvement wherein said operative mounting means comprises a plurality of nested cradle assemblies; there are two of said bars for the vertical Z-axis, said lever arm for the Z-axis is rigidly connected to one of said Z-axis bars, and said Z-axis bars are connected together by a linkage securing the two Z-axis bars together for pivoting in opposite directions; there are two of said bars for the horizontal Y-axis and means operatively securing said Y-axis bars together for pivoting in the same direction; said platform is mounted on one of said nested cradle assemblies, and said one cradle assembly is mounted on said base plate at each end by spring hinges, said spring hinges on one side of said one cradle assembly being acted on by one set of Z- and Y-axis bars, and on the other side by another set of Z- and Y-axis bars.

17. The micromanipulator of claim 16 in combination with a remote controller, said remote controller including compensating means to correct for cross-coupling errors in the vertical Z-axis occurring with extreme displacement of said platform in either or both of the horizontal X- and Y-axes, said compensating means in said remote controller being a compensating actuator which responds independently to extremes of displacement in either or both of the X- and Y-axes, said compensating actuator responding to extreme displacements in the X-axis by variations in the length thereof at one end and to extreme displacements in the Y-axis by variations in the length thereof at the other end.

18. The micromanipulator of claim 16 wherein each of said actuators is rigidly anchored to the fulcrum across which its associated lever arm extends, thereby to prevent misalignment of an actuator during actuation of any of said actuators, and each of said lever arms is inwardly oriented from the point of contact with its respective bar, thereby to create a compact micromanipulator.

* * * * *